United States Patent [19]
Abboud

[11] Patent Number: 5,851,576
[45] Date of Patent: Dec. 22, 1998

[54] METHOD FOR MAKING A SPRAY DRIED FAT REPLACEMENT COMPOSITION CONTAINING INULIN

[75] Inventor: Amna Abboud, Cordova, Tenn.

[73] Assignee: Kraft Foods, Inc., Northfield, Ill.

[21] Appl. No.: 640,429

[22] Filed: Apr. 30, 1996

Related U.S. Application Data

[63] Continuation-in-part of Ser. No. 568,593, Dec. 5, 1995, Pat. No. 5,658,609, which is a continuation-in-part of Ser. No. 268,833, Jun. 29, 1994, abandoned.

[51] Int. Cl.⁶ ............................... A23L 1/0522
[52] U.S. Cl. ..................... 426/550; 426/471; 426/804
[58] Field of Search ................. 426/471, 572, 426/550, 285, 659, 804, 604, 611

[56] References Cited

U.S. PATENT DOCUMENTS

| | | | |
|---|---|---|---|
| 2,913,342 | 11/1959 | Cameron et al. | 99/123 |
| 3,453,116 | 7/1969 | Freund | 99/90 |
| 3,464,830 | 9/1969 | Wahba | 99/139 |
| 3,649,302 | 3/1972 | Daggy et al. | 99/139 |
| 3,751,265 | 8/1973 | Seiden | 426/572 |
| 3,752,770 | 8/1973 | Buddemeyer | 252/356 |
| 3,803,333 | 4/1974 | Roudebush | 426/572 |
| 3,955,008 | 5/1976 | Hanamoto | 426/572 |
| 3,995,069 | 11/1976 | Harries | 426/573 |
| 4,135,005 | 1/1979 | Cheng | 426/572 |
| 4,226,894 | 10/1980 | Gawrilow | 426/606 |
| 4,229,480 | 10/1980 | Suggs et al. | 426/24 |
| 4,232,049 | 11/1980 | Blake | 426/572 |
| 4,242,366 | 12/1980 | Morgan et al. | 426/544 |
| 4,310,556 | 1/1982 | Suggs | 426/572 |
| 4,351,852 | 9/1982 | Rule et al. | 426/554 |
| 4,399,155 | 8/1983 | Forsythe | 426/24 |
| 4,419,377 | 12/1983 | Seward et al. | 426/554 |
| 4,424,237 | 1/1984 | Wittman | 426/653 |
| 4,483,880 | 11/1984 | Koizumi et al. | 426/549 |
| 4,678,672 | 7/1987 | Dartey | 426/19 |
| 4,680,184 | 7/1987 | Seiden | 426/654 |
| 4,695,469 | 9/1987 | Forsythe | 426/24 |
| 4,761,292 | 8/1988 | Augustine et al. | 426/321 |
| 4,826,699 | 5/1989 | Soe | 426/564 |
| 4,871,574 | 10/1989 | Yamazaki | 426/471 |
| 5,066,511 | 11/1991 | Cherukuri | 426/658 |
| 5,102,680 | 4/1992 | Glass | 426/572 |
| 5,106,644 | 4/1992 | El-Nokaly | 426/603 |
| 5,133,984 | 7/1992 | Murphy et al. | 426/496 |
| 5,158,798 | 10/1992 | Fung et al. | 426/602 |
| 5,169,671 | 12/1992 | Harada | 426/658 |
| 5,306,514 | 4/1994 | Letton et al. | 426/531 |
| 5,360,627 | 11/1994 | Desai et al. | 426/606 |
| 5,501,869 | 3/1996 | Buliga | 426/658 |
| 5,518,756 | 5/1996 | Dau | 426/572 |
| 5,529,800 | 6/1996 | Bourns | 426/572 |
| 5,658,609 | 8/1997 | Abboud | 426/609 |

FOREIGN PATENT DOCUMENTS

WO 93/06744
A1  4/1993  WIPO ............. A23L 1/0528

*Primary Examiner*—Carolyn Paden
*Attorney, Agent, or Firm*—Fitch, Even, Tabin & Flannery

[57] ABSTRACT

A fat replacement composition and method of manufacture comprising inulin, a first emulsifier selected from mono- and diglycerides, propylene glycol monoesters, lactic acid ester of monoglycerides and mixtures thereof and a second emulsifier selected from DATEM, lecithin and mixtures thereof. The fat replacement composition has utility in ready to spread frosting.

1 Claim, No Drawings

METHOD FOR MAKING A SPRAY DRIED
FAT REPLACEMENT COMPOSITION
CONTAINING INULIN

CROSS-REFERENCE TO RELATED APPLICATIONS

This is a continuation-in-part of application Ser. No. 568,593 filed Dec. 5, 1995 now U.S. Pat. No. 5,658,609 which is a continuation-in-part of application Ser. No. 268,833 filed Jun. 29, 1994, now abandoned.

FIELD OF THE INVENTION

The present invention relates generally to a fat replacement composition and more particularly, to a fat replacement composition which is particularly useful for replacing the fat component in a ready to spread frosting composition and to a ready to spread frosting composition containing such fat replacement system.

BACKGROUND OF THE INVENTION

Ready to spread (RTS) frostings are packaged, ready to use, complete frosting compositions, generally sold in consumer or institutional sized sealed packaging that is ready to apply by the user as a topping for various baked goods such as cakes, cookies or other food products. RTS frostings are intended to be used by the consumer in place of home made "scratch" icing or frosting and have received wide consumer acceptance as a quick and easy way to provide a "home baked" quality to cakes and other confectionery items.

By their very nature, RTS frostings must be shelf stable for extended periods of time at room temperature and upon opening of the container must not exhibit syneresis and must be easily spread upon the surface of the cake or other baked goods by the consumer. In addition to shelf stability and spreadability, RTS frostings must have an acceptable thickness and must exhibit a desirable shine or sheen and color, i.e., it must look like a homemade frosting. In addition to these physical characteristics, the RTS frosting must exhibit the organoleptic and mouthfeel attributes of homemade frosting.

Various RTS frosting formulations have been commercialized. As set forth in U.S. Pat. No. 5,102,680, the disclosure of which is incorporated by reference, most RTS frostings are of the "buttercream" type and typically contain 10% to 20% fat, 7–21% water and 40–80% sweetener. Other RTS frostings are disclosed in U.S. Pat. Nos. 3,464,830, 3,649,302 and 4,761,292. U.S. Pat. No. 4,232,049 discloses an essentially fat-free frosting based upon the use of citrus juice vesicles. As used herein, all references to percent are percent by weight unless otherwise specified.

Heretofore, conventional RTS frostings have generally contained relatively high levels of triglyceride fat in the form of oil and/or shortening in order to be able to provide the desired shelf stability, spreadability and organoleptic properties. As used herein, the term "fat" is intended to mean triglyceride materials but does not include non-triglyceride materials that analyze as fat such as mono and diglycerides based emulsifiers. It would be desirable to be able to provide RTS frostings having a lower fat content, and most desirably, RTS frosting containing essentially no fat. Pat. No. 5,102,680 discloses a low-fat (less than 6%) RTS frosting which has the desirable spreadability and shelf stability of conventional RTS frosting and a less desirable fat free RTS frosting. These RTS frostings are based upon the use of particular emulsifiers and hydrocolloid gelling agents.

It would be desirable to provide a fat replacement composition which when incorporated into RTS frosting as a replacement for fat, results in essentially fat free RTS frosting that is equivalent to shortening containing low fat RTS frosting.

Inulin has been proposed as a fat replacement or substitute in a wide variety of food products and applications. Inulin is a non-crystalline, fibrous solid polysaccharide or mixture of polysaccharides containing beta-1,2 bonded glucofructan polymers of varying molecular weights terminated at the reducing end by a glucose ring. Thus, inulin is a series of repeating 5-member fructose rings terminated by a 6-member glucose ring. Inulin may be represented by the formula $GF_n$ where G is a glucose ring, F is a fructose ring and $n$ is the number of fructose rings. Inulin may be derived from various plant tubers, such as dahlia, sunchoke flower, jerusalem artichokes and chicory. Commercially available inulin is generally obtained by water extraction from chicory and is available in several degrees of polymerization (DP), generally between 2 to 15. The average value of $n$ is generally in the range of from about 8 to about 13 depending upon the extraction processing conditions and in most instances, inulin of the general formula $GF_n$ is non-digestible when the $n$ value is greater than about 2.

Inulin is available commercially from Cosucra under the tradename FIBRULINE and from Rhône Poulenc under the tradename RAFTILINE in the form of a free flowing spray dried powder or agglomerate. Inulin acts as a gelling agent when dispersed and hydrated in water.

Attempts to directly incorporate commercially available inulin as a replacement for fat in RTS frostings were not successful in that it was difficult to fully hydrate the inulin with the result that the frosting had an undesirable sandy or gritty texture or mouthfeel rather than the creamy mouthfeel of homemade frosting. The RTS frosting also has a runny consistency of too low viscosity to properly cling to the surface of the baked goods as does homemade frosting. Further, the RTS frosting had a stringy texture that was not easily spreadable. Although after standing one or two days, the inulin containing RTS frosting gelled sufficiently to provide some spreadability, inability to produce an immediately spreadable frosting with good texture and mouthfeel caused inulin to initially be deemed to be an unacceptable fat substitute for RTS frostings.

SUMMARY OF THE INVENTION

Generally, the present invention is directed to a fat replacement composition system comprising between about 60 and about 93% inulin, between about 4% and about 30% of a first emulsifier selected from the group consisting of mono- and diglycerides, propylene glycol monoesters, lactic acid ester of monoglycerides and mixtures thereof, and between about 3 and about 30 percent of a second emulsifier selected from the group consisting of diacetyl tartaric acid ester of monoglycerides (DATEM), lecithin and mixtures thereof. The present invention is also directed to a RTS frosting comprising between about 60 and about 85% sweetener, between about 0.1 and about 1% gelling agent, such as a gum, pectin or gelatin, between about 0.1 and about 2% flavoring agents and other minor ingredients such as preservatives, pH adjusting agents, etc., between about 6 and about 9% water and between about 3 and about 25% of the fat replacement composition.

The fat replacement system contains between about 60 and about 93% inulin. As the inulin content increases, lesser amounts of the emulsifiers are required in order to provide a RTS frosting which has the requisite thickness and spreadability. Generally, the inulin has a DP not less than about 8, and has a gel strength of between about 180 and about 250 gm. The gel strength is measured on a TA-XT2 texture analyzer available from Stable Micro Systems of Haslemere, Surrey, England using a TA-4½ inch diameter acrylic cylinder probe with a radius edge. The force, in grams, required to cause the probe to penetrate 5 mm into the sample is the gel strength or firmness of the sample. The gel strengths indicated herein were measured at room temperature 24 hours after preparation of a 30% solids aqueous inulin sample.

When inulin comprises the entire fat replacement system and is directly mixed with the other frosting ingredients, RTS frostings made therefrom have poor spreadability and insufficient viscosity, i.e., thickness, upon formulation to provide a desirable product and have an undesirable gritty and dry mouthfeel.

It has been discovered that particular combinations of emulsifiers at particular concentrations when combined with inulin and dried to form a particulate homogeneous product, such as by spray drying, function to complex, modify and stabilize the inulin in a manner such that the resulting composition may be used as a fat replacement in RTS frostings. Indeed, certain combinations of emulsifiers appear, although the reasons therefore are not fully understood, to exhibit a synergistic effect when the fat replacement system is employed as an RTS frosting. Further, RTS frostings may be prepared in which triglyceride fat is completely eliminated and which are fully equivalent to presently available low fat (less than 6%) RTS frostings. As used herein, the term "fat free" is intended to mean products that are permitted to be labeled as such by government regulations. RTS frostings containing less than about 0.5 g fat per 34 gram serving size can be labeled "fat free"; those containing less than about 3 g fat per 34 gram serving size are considered to be "low fat".

While the primary emphasis of the present invention is to provide a fat replacement composition that can be conveniently employed to prepare a fat-free RTS frosting, it should be understood that the fat replacement composition is also useful at higher levels, to prepare RTS frostings that are labeled "low fat" due to the presence of ingredients such as mono- and diglycerides, that analyze as fat. It is also possible to include the fat replacement composition in RTS frostings that include some triglyceride fat.

The fat replacement composition may also be utilized in foods other than RTS frostings. Examples of such uses include cookies and other baked goods, coffee whiteners and sauces, soups and gravies, and ice cream.

The fat replacement composition contains a first emulsifier selected from the group consisting of mono and diglycerides, propylene glycol monoesters, lactic acid ester of monoglycerides and mixtures thereof.

The mono- and diglyceride emulsifier is a mixture of monoglycerides (the active component) and diglycerides generally containing in excess of 25% monoglycerides, preferably in excess of 40% monoglycerides, and having an I.V. between about 40 and about 75. Mono- and diglycerides are available from a large number of commercial sources. The mono-diglyceride may be prepared by known procedures involving the reaction of glycerin with certain fats, oils or fatty acids and is usually available as the crude reaction product which also comprises diglyceride, triglyceride, glycerin and free fatty acid. Commercial monoglycerides are also available in a relatively pure distilled form which may be used in place of the mixture. Both alpha and beta isomers of monoglyceride are included in varying amounts, depending on whether the esterification occurs at the terminal or center carbon atom of the glycerin, but these isomers equilibrate by acyl migration upon storage to result in about 88% alpha monoglyceride.

RTS frostings containing a fat replacement system comprising only inulin and a first emulsifier are generally gritty and too soft and runny to provide an acceptable RTS frosting although the combination of inulin with the first emulsifier does improve the spreadability of the RTS frosting in the as formulated state to some extent. Experiments have established the general interchangeability of the first emulsifiers all of which have a relatively low HLB, i.e., 4.0 or lower. Other emulsifiers having generally similar emulsifying properties when incorporated in inulin fat replacement compositions are also contemplated as within the scope of the invention.

Propylene glycol monoester is commercially available as a food grade emulsifier from a number of sources containing from about 30%–60% propylene glycol monoester, most preferably 50–60% propylene glycol monoester, which is the active component. The fatty acid used in the esterification reaction is preferably saturated and has a chain length of from 12 to 22 carbon atoms, preferably palmitic or stearic acid, or admixtures thereof and has an I.V. of between about 40 and about 65. Specific partial esters which are suitable are propylene glycol monostearate, propylene glycol monopalmitate, propylene glycol monolaurate, alone or in combination with the comparable diesters and each other. Lactic acid esters of monoglycerides are also available from a large number of commercial sources.

Lactic acid ester of monoglycerides is the monoglyceride, or mixtures of mono- and diglycerides, as described herein, further esterified with lactic acid.

It has been found that the inclusion in the fat replacement system of a second emulsifier selected from the group consisting of diacetyl tartaric acid ester of monoglyceride (DATEM), lecithin and mixtures thereof results in RTS frostings having a somewhat duller appearance like that of a fat containing frosting and a much improved thickness and spreadability immediately upon formulation.

DATEM is commercially available from a number of sources, for example, under the tradename PANODAN from Danisco, the monoglyceride chain being predominantly $C_{16}$–$C_{18}$. Lecithin is also widely available from a number of commercial sources.

The second emulsifier may also include, at a level of up to 6% of the fat replacement composition, sodium steroyl 2-lactylate.

The good physical attributes of the RTS frosting are maintained over extended shelf life of up to one year or more when the combination of a first and second emulsifier is employed in the inulin containing fat replacement composition. The exact mechanism by which the combination of first and second emulsifiers complexes and/or stabilizes the inulin is not known. However, manufacturing and taste testing have demonstrated that a fat replacement composition as described herein results in a fat free RTS frosting that compares favorably to conventional fat containing RTS frostings.

RTS frostings containing the disclosed fat replacement composition can be formulated that have a desirably low water activity ($A_W$) without sacrificing physical or organoleptic properties of the frosting and which do not support bacterial spoilage. Water activity is the ratio of the partial pressure of water in a composition to the vapor pressure of pure water at the same temperature and is a measure of the free or unbound water present. Food products having a relatively high water activity above 0.75 provide an environment that is conducive to the growth of bacteria, yeast and mold which can result in spoilage when the product is exposed to air such as might occur when a frosted cake is not immediately consumed or where only part of the contents of a prepackaged RTS frosting is used and the remainder is stored for future use.

In accordance with the present invention, fat free and low fat RTS frostings can be prepared that have an $A_W$ below 0.75, for example 0.71 to 0.74, without sacrificing either physical or organoleptic properties. Commercial low fat RTS frostings purchased in the marketplace exhibited $A_W$'s over 0.75 and were therefore susceptible to spoilage in the absence of a preservative.

The ingredients of the fat replacement composition are preferably hydrated together to form a homogeneous slurry, mixed for a period of time sufficient to hydrate the inulin and then spray dried to provide a particulate free flowing powder which is conveniently added to the other ingredients in the manufacture of an RTS frosting. The slurry generally has a solids content of between about 40 and about 65 percent, and is spray dried in accordance with standard spray drying techniques, for example, inlet temperatures of between about 360° and 400° and outlet temperatures of between about 160° and about 200° F., to provide a free flowing particulate material that is convenient to use when manufacturing RTS frostings.

In order to provide for convenient preparation of the fat replacement composition using conventional fluid handling equipment, the combining, mixing and handling of the ingredients is carried out under conditions that minimize or retard gelation of the inulin. If the inulin containing mixture is subjected to high shear, the inulin will quickly gel into a semisolid mass which is difficult to pump and spray dry.

The ability of the inulin to hydrate in a reasonable period of time has been found to be both temperature dependent and pH dependent. The water used to form the slurry prior to spray drying should be hot, i.e., above 130° F., preferably 160° F. and the pH of the slurry should be maintained above about 6.0, preferably in the range of about 6.2 to about 6.8.

Careful control of the pH during formulation and spray drying is particularly necessary when DATEM is used as the second emulsifier. DATEM at 10% solids in water has an acid pH of about 2.4 and DATEM containing fat replacement compositions of the type described herein, without appropriate pH adjustment, have pH's well below 6.0, for example, 3–4.5. Control of the pH of the inulin containing slurry to above 6.0 during mixing and spray drying may be accomplished by the addition of any of a number of known pH adjusting agents such as dipotassium phosphate, disodium phosphate, trisodium phosphate, hexametaphosphate and sodium citrate dihydrate may be conveniently employed. The materials also help to prevent protein precipitation by sequestering any metallic ions present as, for example, in hard water. About 0.5 to about 2.0% pH adjusting agent can typically be used.

A water soluble protein encapsulating agent is preferably added to the slurry to aid in spray drying. Suitable agents include sodium and potassium caseinates and soy or whey protein concentrates and isolates. Typically, between about 1 and about 5% sodium caseinate, by weight of the spray dried powder can be used, although other amounts can be used if desired.

The fat replacement composition is prepared by heating the first and second emulsifiers in a jacketed tank to approximately 160° F. (71.1° C.) under mild agitation. The protein encapsulating agent, e.g., sodium caseinate is added and dispersed thoroughly after which the water and pH adjusting agent, e.g., dipotassium phosphate, if needed, are then added and agitated until a uniform mixture is obtained. The inulin is then slowly added under mild agitation and mixing is continued until the inulin is completely hydrated, approximately 30 minutes. Thereafter, the mixture is pasteurized at 160° F. for 30 minutes and homogenized in a 2-stage homogenizer at 1500 psi/500 psi and spray dried under at an inlet temperature of 369° F. and an outlet temperature of 165° F. When the fat replacement composition as disclosed herein, is used in RTS frostings intended to be labeled as being fat-free, the fat replacement composition should usually comprise less than 5%, preferably between about 3 and about 5%, of the RTS frosting. Up to about 25% of the fat replacement composition may be employed in RTS frostings which are low fat o which include some actual fat.

EXAMPLE 1

A control sample fat replacement system containing 100% inulin was prepared. 38.66 pounds of FIBRULINE™ inulin powder were added to 59.17 pounds of water containing 1.34 pounds of a 95% solids sodium caseinate and 2.0 pounds of a 50% solids dipotassium phosphate at 160° F. The mixture was then pasteurized at 160° F. for 30 minutes, homogenized at 1500/500 psi and spray dried at an inlet temperature of 395° F. and an outlet temperature of 165° F. to provide a particulate free flowing inulin powder.

EXAMPLE 2

A fat replacement composition in accordance with the present invention was prepared. 9.97 pounds of a mixture of mono and diglycerides sold under the tradename SUPER G10™ by A. C. Humko (43% alpha monoglycerides, IV 68.0) was introduced into a kettle and heated to 160° F. to melt the mixture. A mixer was then turned on and 3.15 pounds of diacetyl tartaric acid ester monoglyceride sold under the tradename PANODAN 205™ by Danisco was added to the tank along with 0.56 pounds of 95% solids sodium caseinate and 1.6 pounds of a 50% solids dipotassium phosphate. 25.4 pounds of FIBRULINE™ brand inulin was slowly added to the mixture at 160° F. and mixed under moderate shear until the inulin was completely hydrated. The mixture was thereafter pasteurized at 160° F. for 30 minutes and homogenized in a 2-stage homogenizer at 1500/500 psi after which it was spray dried under conditions so as to avoid carmelization. The spray dried product contained 63.85% inulin, 24.93% mono and diglycerides and 7.88 percent DATEM.

EXAMPLES 3–13

The following fat replacement systems were prepared in accordance with the manufacturing conditions of Example 2, all amounts being percent by weight of the finished spray dried product of inulin and the emulsifiers, the other ingredients being as stated in Example 2.

| Example | 3 | 4 | 5 | 6 | 7 | 8 | 9 | 10 | 11 | 12 | 13[5] |
|---|---|---|---|---|---|---|---|---|---|---|---|
| Inulin | 70.0 | 70.0 | 70.0 | 80.0 | 80.0 | 80.0 | 65.0 | 65.0 | 65.0 | 65.0 | 65.0 |
| Mono and Diglycerides[1] | 13.66 | 6.66 | 20.0 | 8.33 | 4.16 | 12.5 | 21.66 | | | | |
| Lactic acid ester of monoglycerides[2] | | | | | | | | 21.66 | | 10.0 | 10.0 |
| Distilled monoglycerides[3] | | | | | | | | | 21.66 | 15.83 | 15.83 |
| Diacetyl tartaric acid ester of mono- glycerides[4] | 13.66 | 20.0 | 6.66 | 8.33 | 12.5 | 4.16 | 7.0 | 7.0 | 7.0 | | 3.0 |
| Lecithin | | | | | | | 3.0 | 3.0 | 3.0 | 5.83 | 1.5 |

[1]Super "G" 10, AC Humko
[2]Lactem P22K, Danisco Ingredients
[3]Dimodan BPTK, Danisco Ingredients
[4]Panodan 205, Danisco Ingredients
[5]Also included 1.33% sodium steroyl 2-lactylate Each of the fat replacement compositions was evaluated in a standardized fat-free RTS chocolate frosting formulation having the following composition.

| Ingredient | Grams | % |
|---|---|---|
| Sweetener (mixture of powdered sugar and high fructose corn syrup (71% solids) | 380.0 | 80.39 |
| Defatted Cocoa | 22.0 | 4.65 |
| Nonfat Dry Milk | 5.0 | 1.06 |
| Gum | 0.4 | 0.08 |
| Water | 45.0 | 9.52 |
| Fat Replacement System | 18.0 | 3.81 |
| Flavoring Agents, Preservatives and minor ingredients | 2.3 | 0.47 |
| TOTALS | 472.7 | 99.98 |

The ingredients were mixed and aerated in a standard mixer for about 3 minutes. The density of the frostings varied between about 1.15 and about 1.33 gm/cc.

With the exception of Example 12, which had a water activity of 0.753, all of the RTS frostings had a water activity of below 0.75.

The visual appearance of the frostings was observed for color and shine or sheen. The frostings were then applied to the surface of a commercially available fat free snack cake mix sold by General Mills under the tradename SWEET REWARDS with a kitchen spatula. While there was variations in the thickness or viscosity and spreadability of the different Examples, all were found to be acceptable and generally equivalent to commercially available low fat RTS frostings. Best performance was found in Examples 2, 10 and 13.

EXAMPLE 14

A fat-free french vanilla RTS frosting was prepared having the following composition incorporating the fat replacement composition of Example 2.

| Ingredient | % |
|---|---|
| Sweetener | 87.65 |
| Water | 7.01 |
| Gum | 0.09 |
| Starch | 0.47 |
| Vanilla Flavor and Minor Ingredients | 0.57 |
| Fat Replacement Composition | 4.21 |
| | 100.00 |

The beaten frosting had a light color and acceptable texture and spreadability.

EXAMPLE 15

A low-fat chocolate fat-free RTS frosting having the following composition was formulated using the fat replacement composition of Example 2.

| Ingredient | % |
|---|---|
| Sweetener | 76.05 |
| Non-fat dry milk | 1.00 |
| gum | 0.08 |
| water | 10.01 |
| defatted cocoa | 4.40 |
| chocolate flavor and minor ingredients | 0.46 |
| fat replacement composition | 8.0 |
| | 100 |

The ingredients were blended and mixed to provide a frosting having a density of 1.1 gm/cc and an $A_W$ of 0.714. The frosting had an acceptable sheen and texture, a light chocolate color and was easily spreadable.

What is claimed is:

1. A method for the manufacture of an inulin containing spray dried fat replacement composition comprising preparing a mixture of emulsifiers and water having a pH above about 6.0, adding inulin to said mixture, hydrating the added inulin while maintaining the pH of said mixture above about 6.0, and spray drying said mixture.

* * * * *